C. E. MACARTHY.
Horse Power.
No. 201,807. Patented March 26, 1878.
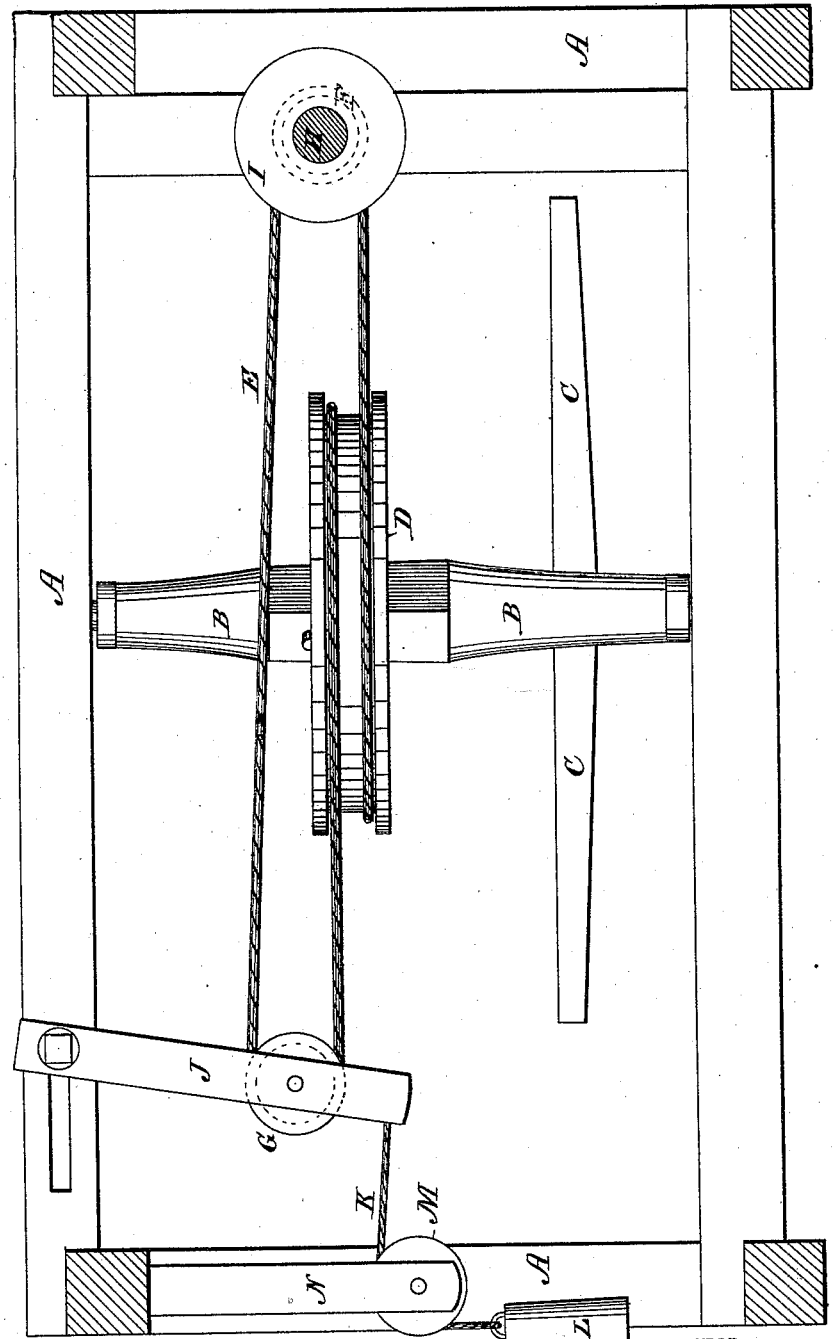
WITNESSES:
INVENTOR:
C. E. Macarthy
BY
ATTORNEYS.

UNITED STATES PATENT OFFICE.

CHARLES E. MACARTHY, OF FORSYTH, GEORGIA.

IMPROVEMENT IN HORSE-POWERS.

Specification forming part of Letters Patent No. 201,807, dated March 26, 1878; application filed March 9, 1878.

*To all whom it may concern:*

Be it known that I, CHARLES E. MACARTHY, of Forsyth, in the county of Monroe and State of Georgia, have invented a new and Improved Horse-Power; and I do hereby declare that the following is a full, clear, and exact description of the same, reference being had to the accompanying drawing, forming part of this specification, in which the figure is a side view of the horse-power with the frame in vertical section.

The object of my invention is to provide a cheap and simple form of horse-power, such as may readily be constructed upon plantations for thrashing or grinding grain or ginning cotton.

To this end my invention consists in arranging upon the vertical king-post, to which the lever is attached, a large horizontal grooved pulley or wheel, and combining with the same an endless rope belt, which is once wrapped around the said horizontal pulley, and is then passed around a vertical speed-pulley upon one side of the king-post, and then around a vertical tension-pulley, as hereinafter more fully described.

In the drawing, A represents the frame-work of the horse-power, in which is arranged, in suitable bearings, the vertical king-post B, carrying one or more levers, C, to which the draft-connection of the team is applied. At a suitable height above the lever is firmly fixed to the king-post a large horizontal band-wheel, D, having upon its periphery a groove to receive the endless rope belt. E is said belt, which is wrapped once around the king-post wheel D, and is then extended around a speed-pulley, F, on one side, and a tension-pulley, G, upon the other. The said speed-pulley F is located upon a shaft, H, carrying a band-pulley, I, designed to receive the band connecting with the gin, thrasher, or mill. The tension-pulley G is journaled in a swinging frame, J, pivoted at the top to the frame-work by means of a slot and bolt, and is strained to tighten the belt by means of a weight, L, connected to the said swinging frame by a cord, K, which passes over a roller, M, fixed in a frame, N.

The advantages of this arrangement of horse-power are to be found in its cheapness, simplicity, and absence of noise. The endless rope belt also, while costing not more than one-sixth as much as a rubber band, possesses the further advantage, in this peculiar arrangement of parts, of transmitting power from one band-wheel to another at right angles thereto, without the objectionable twisting of the band and the tendency of the same to run off the wheel. The endless rope belt is made also to completely encircle the king-wheel, which gives a greater amount of frictional surface, and hence gives a more positive driving effect.

Having thus described my invention, what I claim as new is—

The improved horse-power, consisting of the combination of a tension-pulley, a horizontal band-wheel on the king-post, a speed-pulley, and an endless rope belt wrapped once around the king-post wheel, and then distended about the speed-pulley and tension-pulley, substantially as described.

CHARLES EDWARD MACARTHY.

Witnesses:
W. M. WILLIAMS,
T. N. KING.